United States Patent [19]

Nakamura et al.

[11] 4,402,027
[45] Aug. 30, 1983

[54] MAGNETIC TRANSDUCER WITH BUILT-IN STEP-UP TRANSFORMER

[75] Inventors: Kazuo Nakamura, Toyonaka; Masaru Higashionji, Katano, both of Japan

[73] Assignee: Matsushita Electric Industrial Co., Ltd., Kadoma, Japan

[21] Appl. No.: 293,984

[22] Filed: Aug. 18, 1981

[51] Int. Cl.³ ............................................. G11B 5/20
[52] U.S. Cl. ................................................. 360/123
[58] Field of Search ...................... 360/123, 125, 128

[56] References Cited

U.S. PATENT DOCUMENTS 3,881,194 4/1975 Heaslett ............................. 360/123
4,238,752 12/1980 Lanik ................................. 360/123

Primary Examiner—John H. Wolff
Attorney, Agent, or Firm—Wenderoth, Lind & Ponack

[57] ABSTRACT

A construction is disclosed of a magnetic transducer having a built-in step-up transformer. A ring head portion of the transducer consists of a ring head core defining a substantially closed magnetic path including a front non-magnetic gap and an internal winding aperture, and of a signal winding disposed on the ring head core so as to be interlinked with the magnetic path of the ring head core. A transformer portion of the transducer is mounted at a rear plane of the ring head core and consists of a transformer core, a primary winding, a secondary winding and a rear portion of the ring head core. The transformer core includes a central yoke, at least one peripheral yoke and a linkage yoke. The central yoke and the peripheral yoke are connected with each other at one end by the linkage yoke and at the other end by the rear portion of the ring head core. The primary and the secondary windings are disposed on the transformer core encompassing the central yoke in a coaxial manner, so as to form a shell-type transformer. The ring head portion is coupled to the transformer portion by connecting the signal winding to the primary winding.

12 Claims, 33 Drawing Figures

MAGNETIC TRANSDUCER WITH BUILT-IN STEP-UP TRANSFORMER

BACKGROUND OF THE INVENTION

The present invention relates to a magnetic transducer with a built-in step-up transformer and, more particularly, to a magnetic transducer having a single turn signal winding coupled to a step-up transformer which is integrally assembled with a magnetic ring head core. Still more particularly, the invention is concerned with a construction of a step-up transformer in which the transformer shares part of its magnetic path with a rear portion of a magnetic ring head core.

The art of magnetic recording now encompasses a wide range of applications including those used in video, digital, instrumentation and audio recording. Most of these recording systems employ a so-called ring head, a magnetic transducer defining a substantially closed magnetic circuit including a pair of core halves separated by a front non-magnetic gap and defining an internal coil winding aperture, with multi turns of winding being disposed about the core half through the coil winding aperture to be interlinked with the magnetic circuit of the transducer. Transducers used in these systems of course take a great many forms, and various disclosures have been made so far concerning their construction designs, preparation techniques and so on.

In the prior art of ring head construction, however, complications are usually encountered with the winding processes of multi-turn signal coils. This is particularly true of those high frequency recording and reproducing transducers typified by video heads in which the winding aperture is usually extremely small to assure high flux transfer efficiency of the head core: in most cases the winding aperture is too small to be machine-managed, the unavoidable results often being the necessity for exhausting manual labor coil winding processes.

This is where a single-turn transducers can be effectively introduced with step-up transformers being integrally incorporated in the transducers to be coupled with the single-turn winding. This is schematically shown in FIG. 1, where 1, 2, 3 and 4 designate a ring head core, a single-turn signal winding, a step-up transformer and junction lead portions, respectively.

Figure 1:
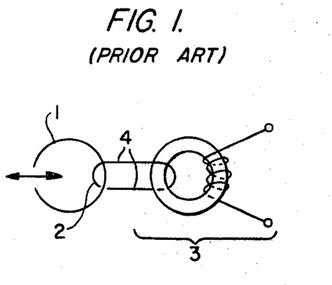
FIG. 1 is a schematic illustration showing the principle of a single-turn step-up transducer.

The type of transducers as shown in FIG. 1 will hereinafter be referred to as single-turn step-up transducers, while transducers having multi-turns of windings about their ring head cores and no built-in transformers will be referred to as multi-turn direct-winding transducers.

It should be noted here that the object of single-turn step-up transducers is not the provision of transducers superior in recording and reproducing performance to multi-turn direct-winding transducers: single-turn step-up transducers only reach comparable levels of performance with their multi-turn direct-winding counterparts when transformers are 100% loss free and single-turn windings are of zero electrical resistance. The object rather is to provide one possible form of transducer which greatly reduces complications in the winding processes associated with multi-turn direct-winding transducers, while of course maintaining comparable transducer performance.

Upon designing a single-turn step-up transducer, therefore, the transfer efficiency of the transformer portion is of vital importance to any type of application, and special considerations have to be given to particular requirements. Reduction of electrical resistance of the single-turn winding is also another important design consideration, since it is directly connected with lowering of the transducer impedance and improvement of transfer efficiency, which are particularly benificial to high frequency applications. Yet another and probably the most important matter, above all, is the construction design by which the winding processes can be completely machine-managed or automated, since such a transducer is one possible answer to the question: how can one put an end to those manual labors?

Figure 2:
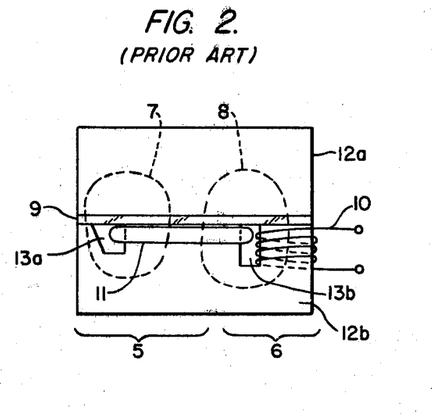
FIGS. 2 and 3 show plan views of conventional single-turn step-up transducers.
Figure 3:
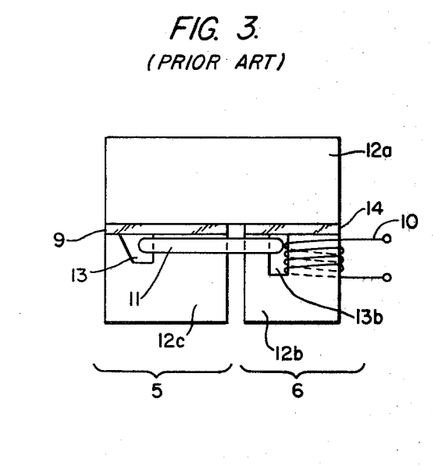
Figure 4:
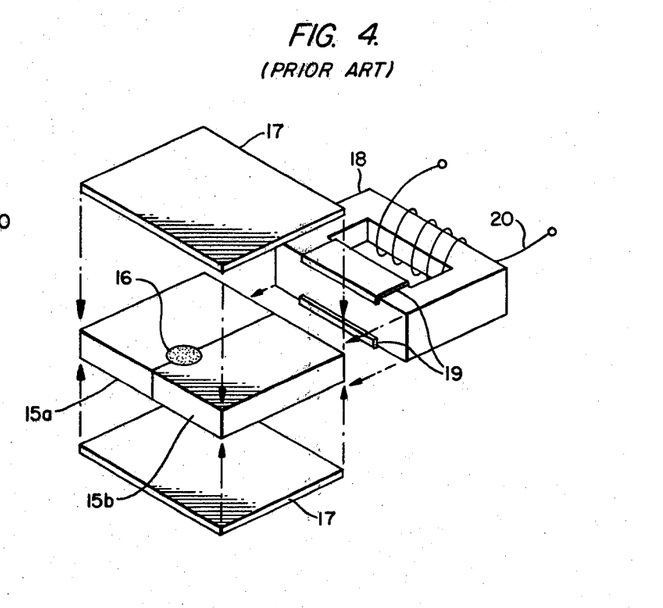
FIG. 4 is an exploded perspective illustration of another conventional single-turn step-up transducer.

FIGS. 2 to 4 show some of the conventional embodiments of single-turn step-up transducers.

Referring first to the construction in FIG. 2, 12a and 12b are head core halves constituted by a pair of plate-like magnetic materials. The head core half 12b has a single-turn winding 11 and a multi-turn transformer winding 10 is provided on the other head core half 12a to form a magnetic coupling, and the single-turn winding 11 forms an electrically closed circuit through a signal winding aperture 13a and a transformer winding aperture 13b. Thus integrally constructed by using core halves 12a, 12b partly in common are a ring head portion 5 and a transformer portion 6 having a non-magnetic operating gap 9 and the main flow of magnetic flux along the path 7 and the path 8, respectively.

The defect in the construction in FIG. 2 is that the single-turn winding 11 and the transformer winding 10 must be positioned only after the core halves 12a and 12b are joined together, thus making the automatic disposition of the windings, transformer winding 10 in particular, quite unpractical. This is because the joining of the core halves is usually done by means of glass, brazing or the like to assure a firmly defined non-magnetic gap and sufficient bonding strength, and the high-temperature bonding treatment inevitably precedes the disposition of either winding 10 or 11.

FIG. 3 shows a construction basically similar to that shown in FIG. 2, but the core half 12b in FIG. 2 is divided in two: the core half 12c and c-shaped transformer core 12d in FIG. 3, thus forming the ring head portion 5 and the transformer portion 6 integrated together. In this construction the core halves 12a and 12c may first be joined by glass, brazing or the like, and then the c-shaped transformer core 12d with the transformer winding 10 being disposed on it can be joined to the rear portion of the head core half 12a by means of a low-temperature adhesive material 14 such as an epoxy resin. The single-turn winding 11 is subsequently positioned to encompass the head core half 12c and the transformer core 12d through the apertures 13a and 13b. Thus automated winding processes may be carried out relatively easily.

In the construction of FIG. 3, however, the adhesion area between the core half 12a and the transformer core 12d is largely restricted by the thickness of the core half and the transformer core, which, for example, is usually less than 200 μm for a typical video head configuration. This may cause a serious lack of bonding strength when the bonding material is a resin or the like which is almost inevitable for this construction.

Referring now to FIG. 4, a pair of core halves 15a, 15b is joined to form a ring head core with an internal coil winding aperture which is to be filled with an electric conductor 16. On either side of the ring head core are deposited thin conductor layers 17 which are in electrical contact through the conductor 16 to form a single-turn signal winding (not closed). On the other hand a step-up transformer 18 is provided with a single-turn primary winding 19 (not closed) and a multi-turn secondary winding 20. The transformer 18 is then joined to the rear edge of the ring head core, and by making an electrical connection between the conductor layer 17 and the primary winding 19 a single-turn step-up transducer is constructed, in which a ring head core, virtually, is magnetically separated from the transformer core.

The transducer having the above construction, however, possesses the shortcomings that since no cores are used in common for a ring head core and a transformer core, the transducer as a whole tends to be somewhat large in size, as well as that the transformer construction itself is not suited for an automated winding processes.

Figure 5:
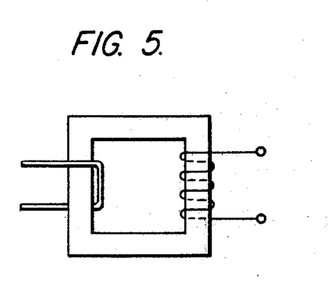
FIGS. 5 and 6 are schematic illustrations showing general constructions of transformers.
Figure 6:
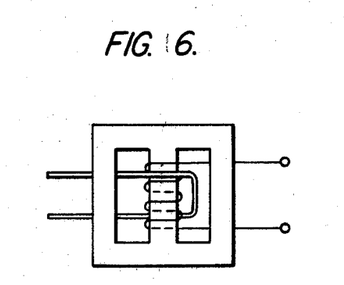

In addition to the problems of the prior art described above, a comment has to be made on the type of transformers employed. Namely transformers are usually of two types: one having a substantially ring shaped magnetic core, with non-coaxial primary and secondary windings being disposed on it as shown in FIG. 5, and the other having coaxially placed primary and secondary windings and a magnetic circuit being being positioned to couple the both windings as shown in FIG. 6. The former is called a core type and the latter a shell type, and it is generally known that the shell type provides higher transfer efficiency. As is evident from FIGS. 2 to 4, step-up transformers employed in the prior art described above are all core-type transformers and hence transducers employing these transformers tend to suffer from poor efficiency.

As is understood from the above descriptions single-turn step-up transducers according to the prior art involve problems of:

(1) difficulties in automating the coil winding processes;

(2) lack of bonding strength in the transformer portions;

(3) insufficient transfer efficiency of the transformer portions; and (4) difficulties in assembling the transducers compactly.

There is one more shortcoming of the conventional embodiments, although it might be too much to describe it as a shortcoming of the transformer itself, which is that since transformer windings protrude to either side of the transducers of the conventional embodiments, it is difficult to laminate the transducers to form multi-channel transducers.

SUMMARY OF THE INVENTION

Accordingly, it is an object of the present invention to provide an improved magnetic transducer having a construction which is extremely suited for automating winding processes.

Another object of the present invention is to provide an improved single-turn step-up transducer which is comparable in performance to multi-turn direct-winding transducers.

Yet another object of the present invention is to provide an improved multi-channel magnetic transducer.

In order to achieve these objects, according to the present invention, a magnetic transducer has a shell-type transformer mounted at a rear plane of a ring head core. The core of the transformer includes a central yoke, at least one peripheral yoke and a linkage yoke. The central yoke and the peripheral yoke are magnetically connected with each other at one end by the linkage yoke and at the other end by a portion of the ring head core. The transformer core is provided with primary and secondary windings which coaxially encompass the central yoke. The primary winding is connected to a signal winding which is interlinked with a magnetic path formed by the ring head core.

Although, as will be described hereinafter, the invention is applicable to all forms of magnetic transducers, it is of greatest benefit in the types of transducers which must meet the most stringent performance requirement, in particular those employed in extremely high frequency recording and reproduction as typified by video recording, and the examples given relate specifically to these types.

BRIEF DESCRIPTION OF THE DRAWINGS

FIG. 7A is a plan view of a single-turn step-up transducer according to the present invention, FIG. 7B a sectional side elevation thereof and FIG. 7C an exploded perspective view of the transformer portion thereof;

FIGS. 8A to 8E are illustrations of various modified transformer cores according to the present invention;

FIGS. 9A and 9B are graphic representations showing how transformer performance is affected by transformer configurations shown in FIGS. 8B to 8E;

FIG. 10A is a plan view of another modified embodiment of the invention, FIG. 10B a sectional side elevation thereof, FIG. 10C a sectional rear elevation thereof, FIG. 10D a plan view of a secondary winding thereof and FIG. 10E a plan view of a primary winding thereof;

FIG. 11 is an exploded perspective view of another modified embodiment of the invention;

DETAILED DESCRIPTION OF THE INVENTION

Figures 7A, 7B, 7C, 8A:
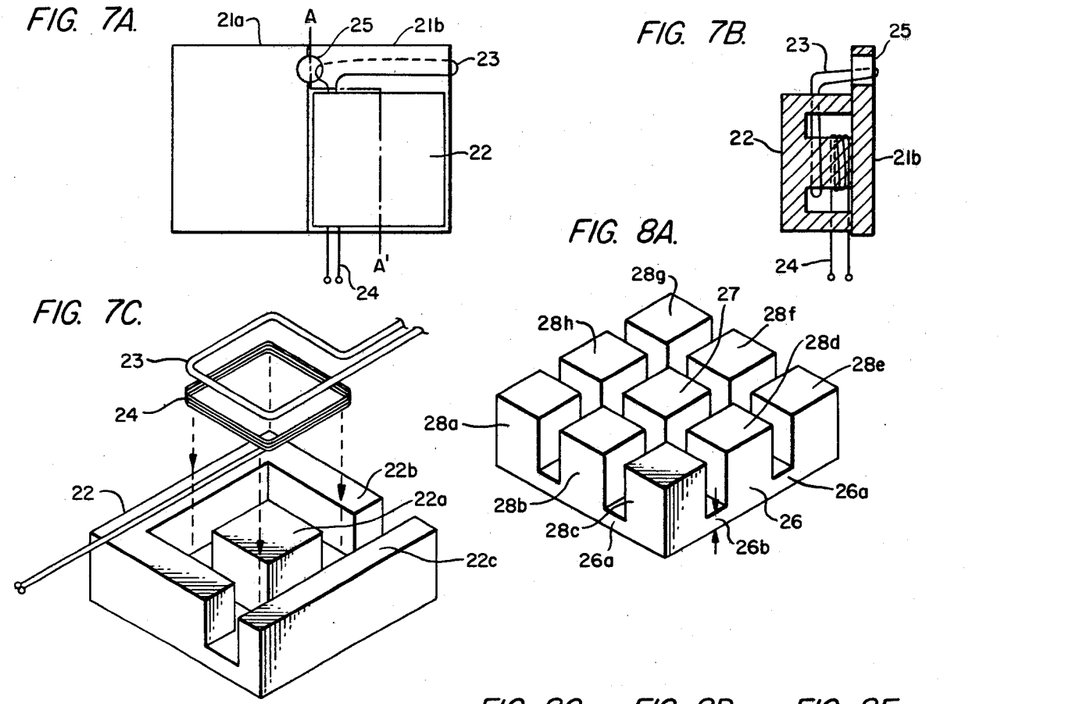

A single-turn step-up transducer in accordance with the invention is shown in FIGS. 7A to 7C which is adapted to be applied to a typical video recording and reproducing transducer for rotary-head recording systems. In the figures a magnetic circuit of a ring head core is provided by a pair of core halves 21a, 21b, usually made of ferrite or sendust. Although the ring head core itself is a vital portion of the transducer, a detailed description will not be given here concerning its configuration design, preparation techniques etc. These may be obtained from the knowledge of prior art and are not of particular importance to the understanding of the invention. 22 is a transformer core which by itself is an open magnetic path, but forms, together with the rear portion of the head core half 21b, a complete closed-magnetic-path shell-type transformer core, like the one shown in FIG. 6. 23 is a single-turn winding encompassing the core half 21b through an aperture 25, and making an interlinkage with the transformer core 22 as well, thus forming an electrically closed circuit to couple the ring head core with the transformer. Obviously the portion of the single-turn winding 23 about the core half 21b forms a signal winding, while the rest of the winding 23 about the transformer core forms a primary winding of the transformer. 24 is a multi-turn secondary winding disposed coaxially with the above-described primary winding.

The configuration of the transformer core will be more clearly understood from FIG. 7C, where 22a is a central yoke on which the primary winding 23 and the secondary winding 24 are coaxially disposed, and 22b, 22c are peripheral yokes disposed so as to complete the closed magnetic path of the transformer core together with the rear portion of the head core half 21b.

In the actual preparation of the transducer the primary and the secondary windings 23, 24 prepared beforehand in their predetermined shapes are positioned to encompass the central yoke 22a, as illustrated in FIG. 7C, and then the transformer core 22 is joined to the rear plane of the head core half 21b by an epoxy resin or the like. The planes of the transformer core and of the ring head core, which face each other upon joining, must of course be mirror-polished so as to assure high transfer efficiency of the transformer portion. Subsequently the two ends of the primary winding are connected after being passed around the head core half 21b through the aperture 25 to form an electrically closed circuit.

As is clearly understood from the above description, construction of the transducer in accordance with the invention is highly suited to automated assembling processes, greatly eliminating complications associated with the winding positioning processes. Moreover, the manner in which transformer core is joined to the ring head core in accordance with the invention provides a sufficiently large adhesion area, thus assuring satisfactory bonding strength as a well as stable magnetic circuit in the transformer portion. Furthermore, the shell-type transformer employed in the invention provides a exceedingly high coupling coefficient K, and the whole transducer can be made quite compact.

Yet another important advantage of the invention resides in that almost any multi-turn direct-winding video head core can be used without any substantial alteration for the ring head portion of the invention. In other words one can change a conventional multi-turn direct-winding video head into its "single-turn step-up version" without any substantial change of the head core but only by the "addition" of a transformer portion. This is a significant difference from those single-turn step-up transducers in accordance with the prior art described before, in which ring head portions must be designed according to each construction.

A similar advantage derives concerning a transducer assembly base. Namely, in the conventional transducers shown in FIGS. 2 to 4, the assembly base has to be so designed as to avoid the windings of the transformer, whereas the transducer of the invention does not require such special consideration. This is because the addition of the transformer in the invention is effected only on one side of the ring head core, rather than to both sides or to the edge portion of the core, so that there are no "obstacles" present on the other side of the head core which faces the assembly base.

These advantages concerning the compatibility of ring head cores and assembly bases are valuable particularly when one intends to replace multi-turn direct-winding video heads that have already been used in mass production with single-turn step-up transducers with a minimum amount of work for the changeover.

Although the advantages of the invention described heretofore are especially prominent when the signal winding and the primary winding of the transformer are of single turn, this is not intended as a definition of the limits of the invention.

A description will now be given of the operation of the transducer thus constructed. Upon reproduction a signal flux is induced in the magnetic circuit of a ring head core as the transducer is caused to scan prerecorded tapes. Then a single-turn winding 23 interlinked with the signal flux induces an emf proportional to the differential of the signal flux in the head core. The emf thus induced excites a transformer to yield an output voltage at a secondary winding 24, which is stepped up in accordance with the winding ratio of the transformer. Recording, on the other hand, can be accomplished by following processes opposite to the reproduction processes described above.

In accordance with the above-described arrangements, the present inventors prepared a single-turn step-up transducer which is adapted to operate as a video head for a VHS-type (VHS is a trade mark), video cassette tape-recorder. For the ring head portion of the transducer there was used a video head core employed in a VHS recorder. The results obtained were quite satisfactory: the difference of the reproduction output between the original VHS head and its single-turn step-up version in accordance with the invention was within ±0.2 dB over the MHz frequency range, where, of course, the number of the turns of winding in the original head and that of the secondary winding of the single-turn step-up transducer were the same namely 17. Although a slight increase was seen in the inductance L and in the real part of the impedance Re(Z) for the single-turn step-up transducer, this was almost a negligible amount for practical applications. The transformer portion itself exhibited an exceedingly high value of the coupling coefficient K being approximately 0.998 over the MHz frequency range. The inventors also performed video S/N measurements and the visual evaluation of the reproduced signal on a TV screen, and the results were that there were no appreciable differences between the original VHS head performance and that of the single-turn step-up transducer of the invention.

Descriptions are now given of the modified embodiments of the invention, and first particularly the modifications of the transformer portion of the transducer.

FIG. 8A shows a modified configuration of the transformer core which is to be substituted for that shown in FIG. 7C. Here, grooves are cut in a plate of magnetic material, the grooves being arranged in parallel crosses so as to define a central yoke 27, peripheral yokes 28a to 28h and a linkage yoke 26a between the central and the peripheral yokes. Although not explained before, the configuration in FIG. 7C of course involves a linkage yoke, too. The virtue of this configuration compared with that shown in FIG. 7C is its ease of preparation: one has only to run a cutter, a diamond wheel for example, four times, twice in parallel and two more times perpendicular thereto.

By employing the transformer core of this configuration, the present inventors prepared a single-turn step-up transducer, and performed various measurements as before. No appreciable differences were seen between the transducers using the cores shown in FIG. 7C and FIG. 8A.

Figure 8B:
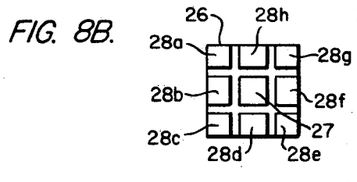
Figure 8C:
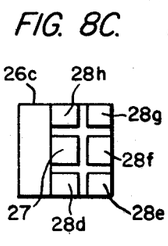
Figure 8D:
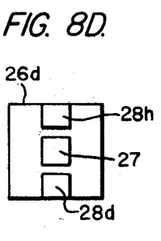
Figure 8E:
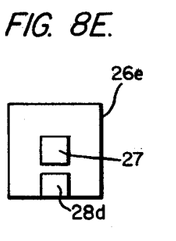
Figure 9A:
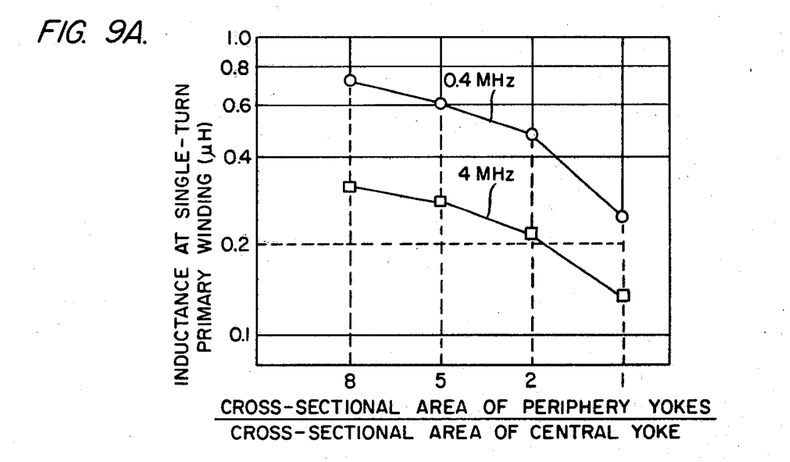
Figures 9B, 10A, 10B, 10C, 10D, 10E, 11:
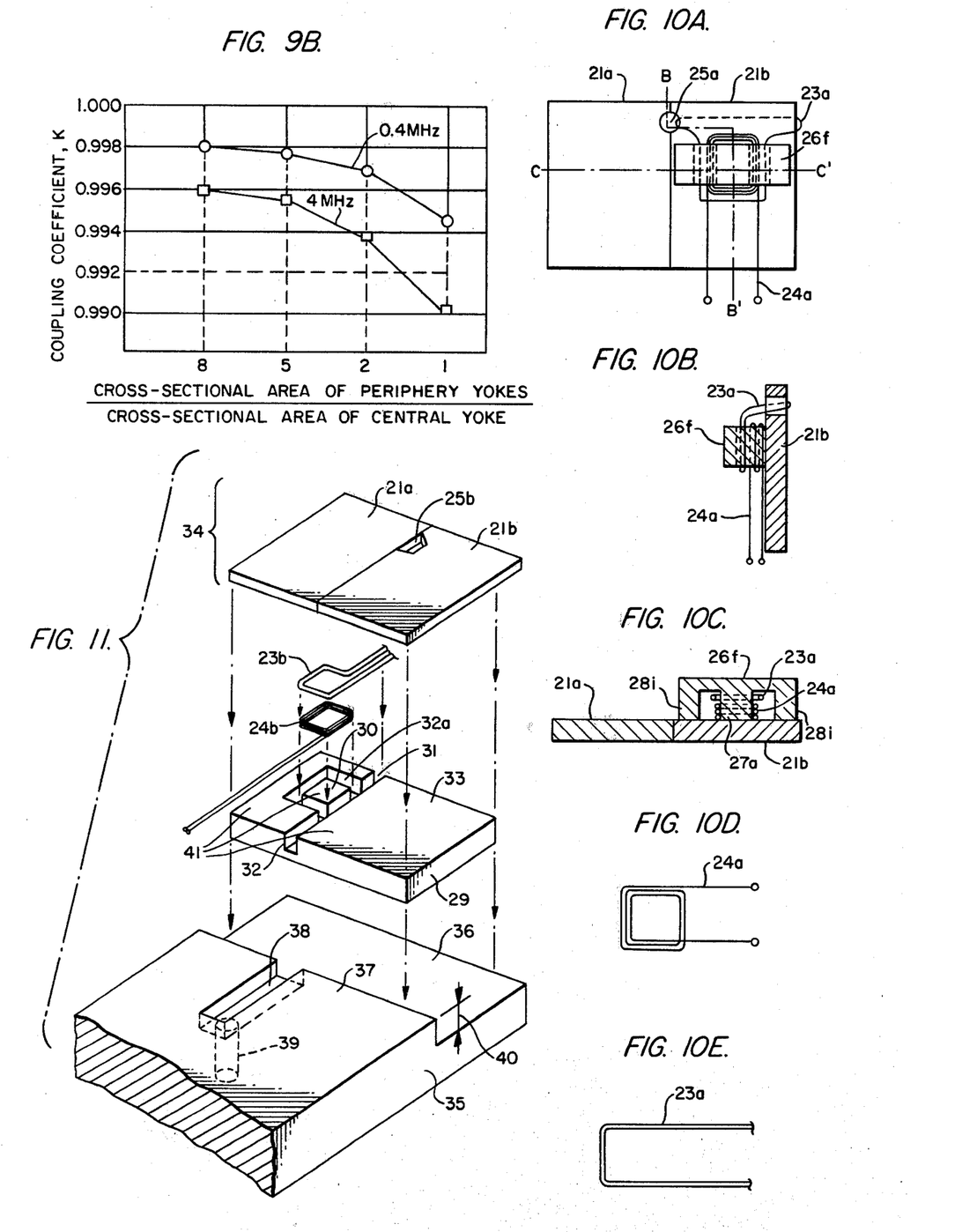

Transformer configurations shown in FIGS. 8B to 8E, and the graphic representations shown in FIGS. 9A, 9B are to explain experiments done to determine the dependence of transformer performance on the ratio of the cross-sectional area of the peripheral yokes to that of the central yoke. First, FIG. 8B shows a core similar to that shown in FIG. 8A, where the cross-sectional area of the central yoke 27 and of each of the peripheral yokes 28a to 28h are the same. Cores shown in FIGS. 8C to 8E are prepared by removing some of the peripheral yokes from the core shown in FIG. 8B: the core in FIG. 8C lacking peripheral yokes 28a, 28b and 28c, the one in FIG. 8D further lacking 28E, 28f and 28g and the one in FIG. 8e still further lacking 28th. Thus there were prepared a core 26 having a ratio of the total cross-sectional area of the peripheral yokes to that of the central yoke of (FIG. 8B), 5 (FIG. 8C), 2 (FIG. 8D) and 1 (FIG. 8E).

By using these transformer cores single-turn step-up transducers were constructed, the an inductance in the single-turn primary winding and the coupling coefficient K between the primary and the secondary windings were measured. These are shown in FIGS. 9A and 9B, where it is seen that losses are almost negligible in the inductance and K where the above-described ratio in no less than 2, whereas they are appreciable for the ratio of 1. Correspondingly, the transducers using transformer cores 26, 26c and 26d showed reproduction output almost the same as that using the transformer core shown in FIG. 7C, whereas the one using the core 26e had a loss of about 1 dB at 5 MHz. In these experiments the thickness of the linkage yoke 26b of each transformer core was twice the thickness of the ring head core, which constituted a part of the transformer's magnetic path.

Experiments were also performed concerning the thickness of the linkage yoke 26b, and it was proved that the thickness of the linkage yoke 26b must not be less than the thickness of the ring head core to assure good transformer performance.

FIGS. 10A to 10B show another modified embodiment of the invention. A pair of head core halves 21a, 21b are joined by glass or the like to form a ring head core with an internal winding aperture 25a. 26f is a transformer core having a central yoke 27a and a couple of peripheral yokes 28i, which form a closed-magnetic-path shell-type transformer core together with the head core half 21b. 23a is a single-turn winding encompassing the core half 21b through the aperture 25a and being interlinked with the central yoke 27a, thus forming an electrically closed loop to couple the ring head core with the transformer. 24a is a multi-turn winding forming a secondary winding of the transformer.

Upon assembling the transducer, the primary winding 23a and the secondary winding 24a prepared beforehand in their predetermined shapes as shown in FIGS. 10D, 10E are disposed around the central yoke 27a, and the thus-prepared transformer core is joined to the rear plane of the core half 21b with the central yoke and the peripheral yokes aligned in parallel to the front edge of the ring head core as shown in FIG. 10A. Then the two ends of the primary winding 23a are joined after being passed around the core half 21b through the aperture 25a to form a closed loop.

A single-turn step-up transducer thus constructed showed a recording and reproduction performance nearly as good as that of the former embodiment shown in FIG. 7A.

Although this construction may appear to be a mere adaptation of the transformer core 26d shown in FIG. 8D, it has special advantages over the former embodiments of the invention. In the first place, since three yokes of the transformer core are aligned in parallel to the front edge of the head core, the transformer core can be positioned closer to the front edge than in the cases of the former embodiments, and hence the single-turn winding 23a can be made shorter, and its electrical resistance can be reduced. And in the second, the primary and the secondary windings can be formed in the shapes shown in FIGS. 10D and 10E, namely in the shapes having no constricted portions unlike those shown in FIG. 7C. This of course makes the length of the primary winding still shorter, and the preparation of the winding easier. In addition to these, it is needless to say that the preparation of the transformer core is extremely easy owing to its simple configuration.

FIG. 11 shows another modified embodiment of the invention, in which a transformer portion is integrated with the transducer assembly base. In the figure, 35 is an assembly base which is usually made of a non-magnetic metallic material. 36 is a stepped portion formed at a front portion of the assembly base 35. 29 is a transformer core similar to that shown in FIG. 7C, but having a relatively large peripheral yoke 33 for the firm adhesion of a ring head core to the transformer core 29. To the stepped portion 36 mentioned above is adhered the transformer core 29, and hence the depth 40 of the stepped portion is made to be nearly the same as the thickness of the transformer core 29. Subsequently, the upper plane 37 of the assembly base and the open face 41 of the transformer core are mirror-polished so that they are in the same plane. 21a and 21b are a pair of head core halves which form a ring head core 34 with an internal winding aperture 25b. The ring head core 34 is then adhered to the open face 41 of the transducer core 29 after primary and secondary windings 23b and 24b are positioned the recesses 31, 32 and 32a encompassing the central yoke 30 as shown in the figure. By this, the same as in the former embodiments, the open magnetic path of the transformer core is made into a closed magnetic path forming a shell-type transformer core. Subsequently, one end of the primary winding is led in through the aperture 25b to be joined with the other, while the leads from the secondary winding are guided along the recesses 38 and taken out through the hole 39, arriving finally at the terminal board (not shown) disposed on the rear side of the assembly base 35. Incidentally, although not directly concerned with the invention, the terminal board is usually placed on that side of the assembly base opposite to that on which a head core is disposed in most of the transducers used in rotary-head video taperecorders, since the face to which the head core is adhered is taken to be the datum plane when the head assembly is mounted in the video cylinder.

In the actual preparation processes, the assembly base 35, the transformer core 29, the primary winding 23b and the secondary winding 24b are assembled in the first place to form a "composite assembly base", and then the ring head core 34 is adhered to the composite assembly base, which is followed by the connection of the primary winding 23b to form the signal winding portion of the single-turn winding.

Figures 12, 13A:
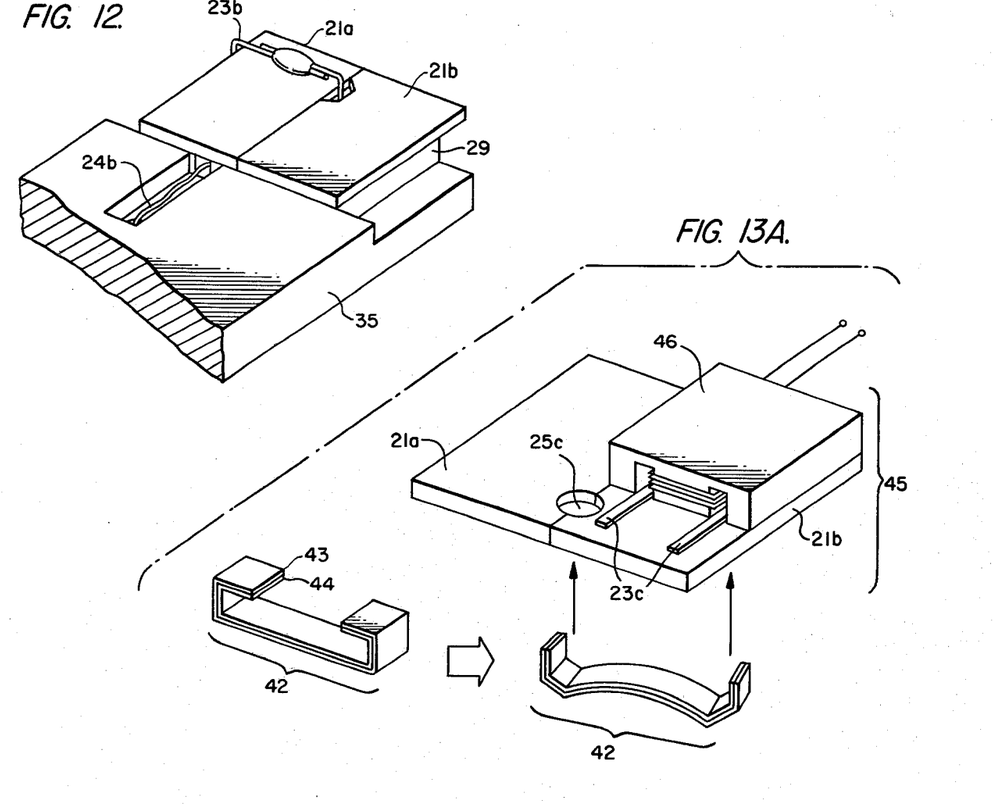
FIG. 12 is a perspective view of the embodiment shown in FIG. 11 in its completed form.
FIG. 13A is an exploded perspective view of another modified embodiment of the invention and FIG. 13B a front elevation thereof.

The transducer in its completed state is shown in FIG. 12.

By virtue of the composite assembly base, the embodiment described above has the advantage over an former embodiments of the invention, which is that the process of adhering the head core to the assembly base and the process of joining the transformer core to the head core, both of which require precision work, can be combined. Although the processes of adhering the transformer core to the assembly base and of forming the stepped portion may by added to the processes of making former embodiments, these are of course jobs of less precision.

Another advantage of the embodiment here is that since the transformer core is adhered to the assembly base in the earlier stage of the preparation, an transformer core, which is usually quite small when the invention is applied to a video head as in the present case, can be handled with greater ease than in the cases of the former embodiments.

Figure 13B:
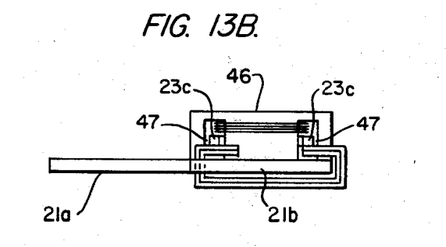
Figure 14:
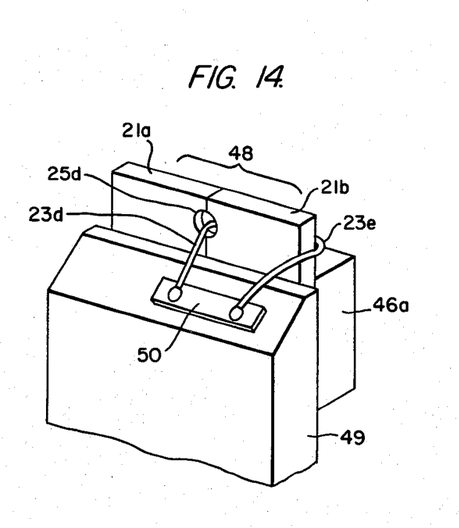
FIG. 14 is a perspective view of another modified embodiment of the invention.

Shown in FIGS. 13A, 13B and 14 are other embodiments specifically concerned with modification of signal windings.

Refering first to FIG. 13A, 45 is an assembly in which a ring head core and a step-up transformer are integrated, but a signal winding. Preparation up to this stage can follow the processes shown in the former embodiments of the invention. A transformer core 46 may be of any type shown before, but illustrated here is one identical to that shown in FIG. 8C. 42 is a single-turn composite signal winding, in which an elastic conductor tape 43 and an adhesive tape 44 are employed to form a c-shaped lamination. The signal winding 42 is positioned to encompass the core half 21b with one end through the aperture 25c, and then is connected to the primary winding 23c at the portion 47 to form a closed circuit as shown in FIG. 13B. The connection may be performed by soldering, laser welding or the like. The adhesive tape disposed inside of the conductor 43 is of course for insulation against and adhesion to the core half 21b.

Refering now to FIG. 14, 48 is a ring head core with which a transformer 46a is integrated in accordance with the invention, while 49 is a transducer assembly base to which a transducer is adhered. On the front portion of the assembly base 49 is provided a conductor portion 50 which is electrically insulated from the base. Then one lead 23e of the primary winding is directed around the side of the core 21b and is connected to the conductor portion 50, and the other lead 23d is led through the aperture 25d and connected to the conductor portion as well. The conductor portion 50 may be disposed on the head core itself in such cases as shown in FIG. 12, where there is room for this arrangement.

The advantage of these modified embodiments concerning the signal winding is the simplicity of the constructions involved, which are highly suited for automating the preparation processes.

As is understood from the description heretofore, one remarkable feature of the transducer in accordance with the present invention is that the transformer windings do not protrude to either side of the transducer, namely transformer windings are sandwiched by the ring head core and the transformer core. This feature, accordingly, is very advantageous when the invention is applied to multi-channel transducers.

Figure 15A:
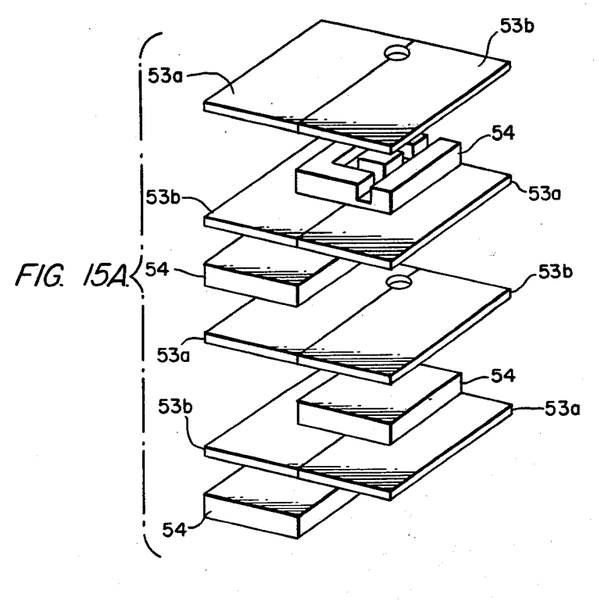
FIG. 15A is an exploded perspective view of a multi-channel transducer according to the invention, FIG. 15B a side elevation thereof and FIG. 15C a sectional front elevation thereof.
Figure 15B:
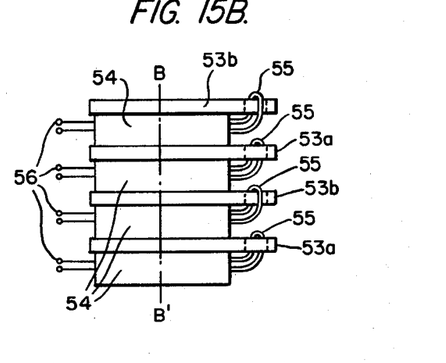
Figure 15C:
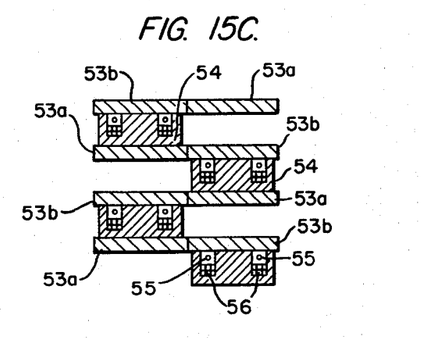

FIGS. 15A to 15C show one such embodiment, in which a four-channel transducer is constructed by laminating single-turn step-up transducer elements, each of which is basically identical to the transducer shown in FIGS. 7A to 7C. In each transducer element, 53a, 53b are a pair of core halves forming a ring head core, 54 is a transformer core, 55 is a single-turn winding which forms a signal winding and a primary winding and 56 is a multi-turn secondary winding. Although this may appear to be a simple lamination of the former embodiment of the invention, the lamination is more easily attained than in the cases where single-turn step-up transducers of the conventional construction are employed for each transducer element, since there is no protrusion of the transformer winding in the direction of lamination.

Figure 16:
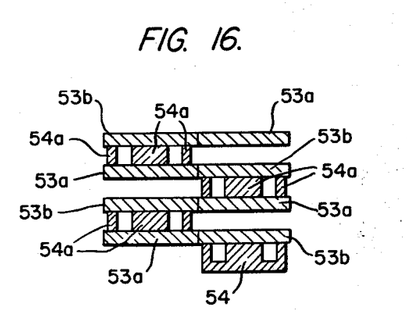
FIG. 16 is a sectional front elevation of a modified embodiment of the invention.

FIG. 16 shows a similar embodiment of that shown in FIGS. 15A to 15C, but the transformer cores are modified so as to reduce the interval between each channel. As is clear from the figure, a transformer core 54a in each transducer element has a construction without a linkage yoke between a central yoke and peripheral yokes, in place of which a head core half 53a constituting an adjacent channel serves as the linkage core, except for the one 54 placed on one end of the transducer.

Figure 17:
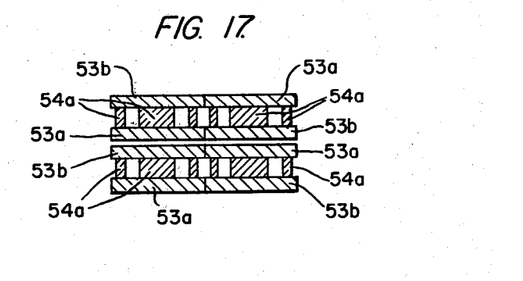
FIG. 17 is a sectional front elevation of another modified embodiment of the invention.

FIG. 17 shows another modification in which still more concentration is achieved by utilizing the space between each ring head core.

Figure 18A:
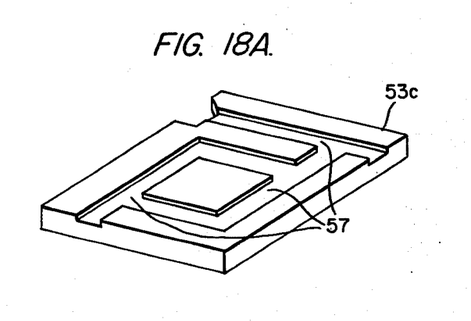
FIG. 18A is a perspective view of a head core half employed in the succeeding embodiment shown in FIG. 18B.
Figure 18B:
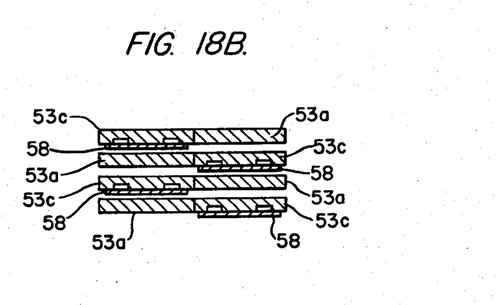
FIG. 18B is a sectional front elevation of another modified embodiment of the invention.

FIGS. 18A, 18B show yet another modification in which each core half 53c has a transformer-core portion integrally built into itself. Grooves 57 is which windings are disposed can be privided by chemical etching, laser engraving or the like means. As shown in FIG. 18B, the means to complete the magnetic path of the transformer can be a simple flat plate 58 of magnetic material for this case, thus providing channel intervals still smaller than in the above described embodiments.

What is claimed is:

1. A magnetic transducer comprising:
   (a) a ring head core defining a substantially closed magnetic path, a front non-magnetic gap and an internal winding aperture;
   (b) a signal winding disposed on said ring head core through said winding aperture so as to be interlinked with said closed magnetic path;
   (c) a transformer core mounted at a rear plane of said ring head core, which has a central yoke, at least one peripheral yoke and a linkage yoke, with said central yoke and said peripheral yokes being magnetically connected to each other at one end by said linkage yoke and at the other end by said ring head core so as to form a shell-type transformer core;

(d) a primary winding, which is disposed about said transformer core encompassing said central yoke, and is connected to said signal winding; and (e) a secondary winding, which is disposed about said transformer core encompassing said central yoke in a coaxial manner with said primary winding.

2. A magnetic transducer of claim 1, in which the ratio of the total of the cross-sectional area of said peripheral yokes to the cross-sectional area of said central yoke is no less than two.

3. A magnetic transducer as claimed in claim 1, in which the minimum thickness of said linkage yoke is no less than the thickness of said ring head core.

4. A magnetic transducer as claimed in claim 1, in which said central yoke and said peripheral yokes are aligned in a direction parallel to a front edge of said ring head core, with said central yoke being positioned in between.

5. A magnetic transducer as claimed in claim 1, further comprising an assembly base for supporting the assembly of said components, with said transformer core being integrated with said assembly base.

6. A magnetic transducer as claimed in claim 1, in which said signal winding is a c-shaped conductor, each end of which is connected to said primary winding on that side of said ring head core on which said transformer core is disposed.

7. A magnetic transducer as claimed in claim 1, in which said signal winding is an extension of said primary winding, each end of which is connected to a conductor portion which is disposed on that side of said ring head core opposite on that to which said transformer core is disposed.

8. A multi-channel magnetic transducer comprising the magnetic transducer of claim 1 as each transducer element.

9. A multi-channel magnetic transducer as claimed in claim 8, in which each of said transformer cores is disposed on one of core halves forming said ring head core with the transformer cores of adjacent channels in staggered condition.

10. A multi-channel magnetic transducer as claimed in claim 8, in which said linkage yoke of each of said transducer elements is a rear portion of said ring head core constituting an adjacent channel.

11. A multi-channel magnetic transducer as claimed in claim 8, in which two of said transducer elements are formed as a unit with said transformer of each element disposed between the two ring head cores of those elements, with one of the transformer cores being located on one side core half of said ring head core and with the other of the transformer cores are the other side core half.

12. A multi-channel magnetic transducer as claimed in claim 8, in which said central and peripheral yokes are formed integrally with said ring head core by providing the surface portion of the ring head core with separating grooves.

* * * * *